Nov. 28, 1939.   O. W. HEISE   2,181,730
PRESSURE GAUGE
Original Filed June 3, 1936
Fig.1
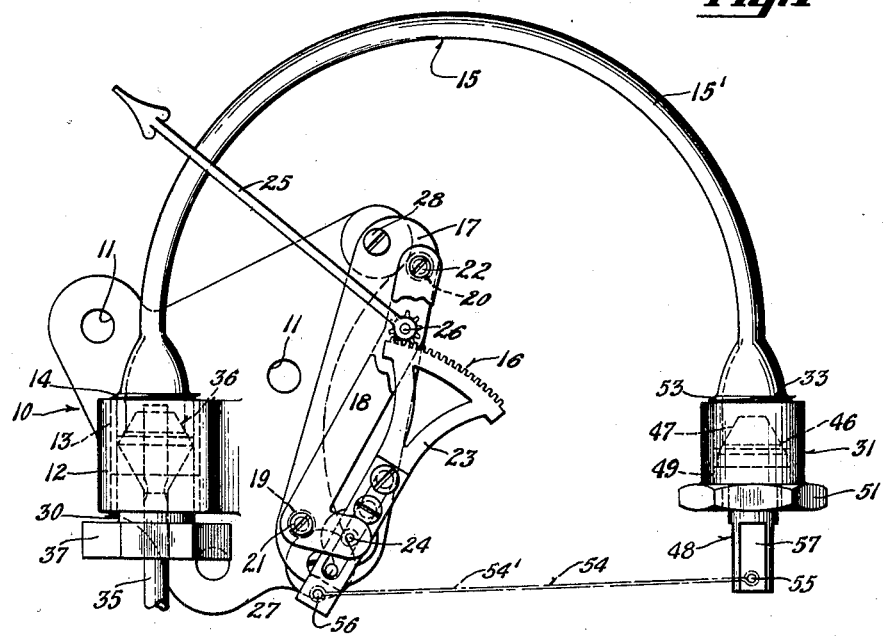
Fig.2
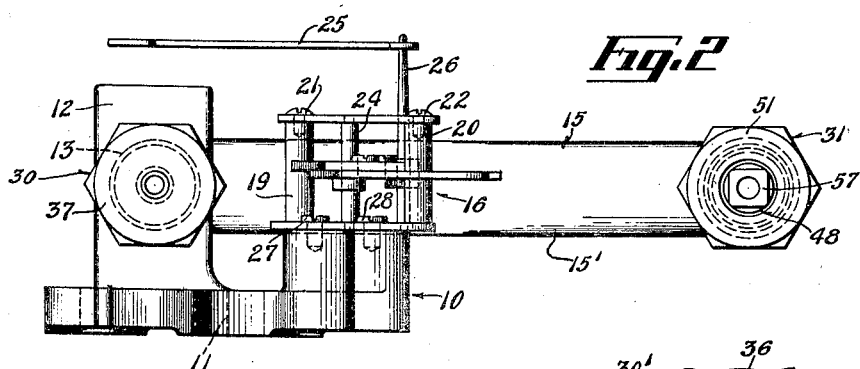
Fig.3
Fig.4
INVENTOR
OTTO W. HEISE
BY William F. Jaeger
ATTORNEY Patented Nov. 28, 1939

2,181,730

UNITED STATES PATENT OFFICE 2,181,730

PRESSURE GAUGE

Otto W. Heise, Bridgeport, Conn.

Original application June 3, 1936, Serial No. 83,188, now Patent No. 2,166,628, dated July 18, 1939. Divided and this application April 4, 1938, Serial No. 199,800

1 Claim. (Cl. 285—166)

This invention relates to pressure gauges, such as those in which a Bourdon tube is used, and especially to highly efficient and leakproof gauges of this type. This application is a division of my copending application, Serial No. 83,188, filed June 3, 1936, and now Patent No. 2,166,628.

The construction of pressure gauges always presents special problems because in these structures it is necessary to confine high pressures in parts of relatively small size. Also, it is highly important to have such gauges absolutely leakproof since any escape of pressure renders the structure inaccurate in its readings and therefore practically worthless, or at least defeats the real intent of the device.

Heretofore, there have been many efforts towards producing a high quality accurate and leakproof pressure gauge. In nearly all of these previous efforts very accurate machining of parts was required and in nearly all of these structures it was necessary to use solder.

In those gauges where solder is used to secure the parts together or to render the connection thereof leakproof there is great danger of the inadvertent release of the solder and breakage of such leakproof connection when the gauge is subjected to heat. Also, any gauge depending upon solder to make a leakproof connection between the parts thereof cannot be used in lines containing materials of high temperature and cannot be used in locations such as near boilers or furnaces where there is considerable heat, because of the relatively low melting point of the solder. These disadvantages of solder are also prevalent in mercury boilers and the like since mercury quickly attacks and dissolves or disintegrates the solder. A disadvantage similar to the latter is also prevalent when the gauge is used in lines of oil refineries and the like where organic and inorganic impurities adversely attack material such as solder.

Under some circumstances a melting, slow disintegration, or eating away of the solder, might not cause any disadvantages. However, in devices such as the present one where such disintegration is followed by great pressure, sometimes 10,000 lbs. per square inch and greater, a leak which will result in an inaccurate reading may occur. There is also the danger of a substantially complete release of the pressure and explosion of the complete pressure gauge. It is not an unusual occurrence for a pressure gauge and the glass plate in the frame thereof to be shattered with possible harm and damage to nearby persons and property.

From the foregoing it will be apparent that from the viewpoint of accuracy and safety it is highly desirable to provide a pressure gauge with close interfitting or associated parts which are leakproof in order to provide a highly accurate and safe pressure gauge. Otherwise the laborious careful and costly work of calibrating the gauge would be entirely defeated the moment a small leak occurs.

In view of the impossibility to use solder in pressure gauges subject to high temperature it has been necessary to weld unions securely, even though parts were brought together by screw threads or the like, in an effort to render the unions absolutely leakproof. However, such welded structures cannot be disassembled for cleaning, adjustments or replacements of parts. Therefore, pressure gauges were often used when containing sediment, with the adverse result that inaccurate readings were obtained. Also, with such structures, it was necessary very often to replace an entire costly gauge because of the inability to replace some small part of the welded together gauge.

It is an important object of the present invention to provide a pressure gauge obviating the shortcomings set forth above and to provide one which is more efficient and accurate in its operation than those gauges heretofore proposed.

In particular it is an object of the present invention to provide a pressure gauge with close fitting or thoroughly associated parts which are absolutely leakproof and in which no solder is required to achieve this end.

It is another important object of the present invention to provide a pressure gauge with interconnecting parts adapted to be disassembled with ease for cleaning purposes, and for the purpose of adjustments, and which will have the characteristic of maintaining an accurate and pressure tight relationship between the various parts when reassembled; thus, dispensing with the usual operation of again calibrating the instrument.

A feature flowing from the accomplishment of these objects includes the provision of a base member forming a chamber inclosing a double tapered sleeve which may be wedged, or partially mushroomed, into the mouth of the Bourdon tube and which will be compressed onto the tubing leading to the Bourdon tube which serves to provide a very leakproof and highly efficient pressure gauge.

Other objects and features will hereinafter appear.

In the drawing, which is illustrative of the present preferred form of the invention:

Figure 1 is a plan view of the internal mechanism of a Bourdon tube gauge, with the present invention included therein.

Fig. 2 is a bottom view of the gauge shown in Fig. 1.

Fig. 3 is an exploded view partly in section of the novel union, provided by the present invention for the inner end of the gauge.

Fig. 4 is a sectional view of a modified form of inner end connection in closed position.

Referring now in detail to the drawing, the present invention is illustrated as comprising a base 10 of irregular form which may be secured to a wall or to a pressure gauge casing as by screws (not shown) passed through holes 11. Preferably the base 10 is provided with an upstanding lug 12 having a threaded bore or chamber 13 adapted to receive a threaded inner end 14 of a Bourdon tube 15.

A pointer mechanism 16 comprising plates 17 and 18 held in spaced relation by rods 19 and 20 with screws 21 and 22 respectively serves to support a movable segment 23 on a pivoted rod 24 and a movable pointer 25 on a pivoted rod 26. Screws 27 and 28 hold the pointer mechanism on the base 10. The pointer 25 cooperates with a calibrated scale, which for simplicity, is omitted from the present showing.

The present invention provides novel and highly desirable leakproof connections 30 and 31 at inner and outer ends 14 and 33 respectively of the Bourdon tube 15 for locating, supporting and securing the Bourdon tube relative to the base and relative to the pointer mechanism 16.

The connection 30 in its present preferred form comprises the threaded bore 13 in the upstanding lug 12 adapted to receive the threaded inner end 14 of the Bourdon tube 15. Because a looped section 15' of the Bourdon tube clears the base substantially it is possible to screw the end 14 into the bore 13 any desired extent. The remaining parts of the connection 30 comprise a feed tube 35 adapted to enter the other side of the threaded bore 13 carrying a double tapered sleeve 36 and a clamping member 37 having a thread 38.

Now of particular importance and as may be seen best in Figs. 1 and 3, to prevent the Bourdon tube 15 from turning in the lug 12 and particularly to provide a leakproof connection 30, the inner end 14 of the Bourdon tube 15 is provided with a bevelled face 39 adapted to receive a tapered wall 40 and the clamping member 37 is provided with a bevelled face 41 adapted to receive a tapered wall 42 on the double tapered sleeve 36. This construction is such that the tapers 40 and 42 on the double tapered sleeve 36 are securely pressed onto the bevelled faces 39 and 41 respectively when the clamping member 37 is tightened, as shown in Fig. 1. At the same time the bevelled faces 39 and 41 press the tapered walls 40 and 42 causing the underlying inner wall 44 of the bore of the tapered sleeve 36 to press down and grip the feed tube 35 at both ends of the sleeve. This structure thus provides a secure and thoroughly leakproof connection, without soldering or welding.

Thus, with the effective connection achieved there is no leakage of the pressure medium from the Bourdon tube into the chamber 13 to contact the base 11. Because of this, the base may be made of relatively inexpensive cast metal. In the absence of such an effective connection, and in constructions where the pressure medium passes freely into a passage in the base, the base cannot properly be made as a casting, which construction is generally too porous to effectively confine the pressure medium.

Also, with the advantageous connection 30 provided by the present invention it is not necessary to turn the Bourdon tube 15 when forcing the tapered sleeve 36 into effective sealing engagement with the Bourdon tube and the feed tube, the forcing of the sleeve being accomplished solely by the clamping member 37. Thus, after the Bourdon tube has once been definitely fixed in proper position prior to effecting its connection to the feed tube, it is not necessary to disturb this setting.

A modified connection 30' is shown fragmentarily in Fig. 4, differing from the connection 30 only in the provision of convex bevelled portions 39' and 41' on the sleeve contacting faces of the Bourdon tube 15 and the clamping member 37 respectively, which have the characteristic of effecting a greater deformation of the sleeve 36 and causing the ends of the latter to press into the feed tube 35 a greater extent.

The complementary connection 31 is more fully described and shown in my copending application, Serial No. 83,188, filed June 3, 1936. It comprises a bevelled face 46 on the outer end 33 of the Bourdon tube 15 adapted to receive a tapered wall 47 of a tapered plug 48. Preferably the plug is provided with a flange 49 adapted to be backed and pushed by a shoulder of a cap 51.

When the connection 31 is completed, as shown in Fig. 1, a connecting mechanism 54 comprising a link 54' looping pins 55 and 56 respectively on an extension 57 of the plug 48 passing outwardly through an aperture in cap 51 and on the segment 43, serves to operate the pointer 25 upon each pressure change or response in the loop section 15' of the Bourdon tube.

The entire connections 30 and 31 can be completely disassembled for clearing out an accumulation of scales, sediment or the like, without difficulty.

Preferably the double tapered sleeve 36 is made of softer material than the Bourdon tube 15 so that it may be pressed toward and onto the feed tube 35 when the clamping member 37 is tightened. For example, the sleeve may be of brass or the like while the Bourdon tube is made of steel or the like. If preferred the bevelled face 39 on the Bourdon tube 15 and the bevelled faces 41 on the clamping members 37 may be omitted for economy in manufacturing, however a bevelled face, especially if machined and lapped, insures a stronger and more leakproof connection.

Other variations and modifications may be made within the scope of this invention and portions of the improvements may be used without others.

Having thus described the invention, what is claimed as new is:

In a pressure gauge, the combination of a stationary supporting base, a lug thereon having a bore therein; a pressure responsive tube having an inner end screwed to said base member in said bore; a feed tube extending into said bore toward said pressure responsive tube; a double tapered sealing sleeve in said bore and on said feed tube, the outside diameter of said sleeve being such as to provide for sliding of the sleeve longitudinally of said bore, and having tapered faces extending respectively into and away from said inner end of said pressure tube; and a rotatable clamping member having a threaded connection with the bore in said lug; engageable with said sleeve in said bore to force the same into sealing engagement with said inner end of the pressure tube, said pressure tube and said clamping member each provided with sleeve-engaging surfaces for forcing said sleeve into sealing and gripping engagement with said feed tube.

OTTO W. HEISE.